June 4, 1968

C. E. KIRKWOOD ET AL 3,386,612

QUICK-OPENING LID FOR PRESSURE VESSELS

Filed July 20, 1966

INVENTORS.
CREAL · E. KIRKWOOD
LOREN HALE

BY

ATTORNEYS

June 4, 1968  C. E. KIRKWOOD ET AL  3,386,612

QUICK-OPENING LID FOR PRESSURE VESSELS

Filed July 20, 1966  3 Sheets-Sheet 2

INVENTORS.
CREAL E. KIRKWOOD
LOREN HALE
BY
Head & Johnson
ATTORNEYS

June 4, 1968

C. E. KIRKWOOD ET AL 3,386,612

QUICK-OPENING LID FOR PRESSURE VESSELS

Filed July 20, 1966

INVENTORS.
CREAL E. KIRKWOOD
LOREN HALE
BY
Head & Johnson
ATTORNEYS

United States Patent Office 3,386,612
Patented June 4, 1968

3,386,612
QUICK-OPENING LID FOR PRESSURE
VESSELS
Creal E. Kirkwood, 1423 South 103rd East Ave. 74128,
and Loren Hale, 3703 East 36th North 74115, both of
Tulsa, Okla.
Filed July 20, 1966, Ser. No. 566,680
4 Claims. (Cl. 220—44)

This invention relates to a quick-opening lid for pressure vessels. More particularly, the invention relates to a pressure sealing lid for a vessel including safety means preventing the lid from being opened while pressure exists within the vessel, and further including means of preventing the lid from becoming accidentally opened.

Many types of pressure vessels require quick opening lids. By "quick opening" is meant such lids must permit expeditious opening ind sealable closing of the vessels. Quick-opening lids are utilized for providing entry for clean-out purposes, inspection, for depositing or removing products, filters, etc., in pressurized vessels. Quick-opening lids constitute a safety hazard in industry if a pressure retaining lid is accidentally opened under pressure. The pressure against the lid when the means securing the lid in closed position is removed causes the lid to swing open very rapidly and with great force sufficient to cause fatal injury.

It is therefore an object of this invention to provide a quick-opening lid for a pressure vessel.

More particularly, an object of this invention is to provide a quick-opening lid for pressure vessels including means of preventing the lid from being opened while pressure exists within the vessel.

Another particular object of this invention is to provide an improved quick-opening lid for a pressure vessel including means of preventing the lid from being accidentally opened or from being opened from vibration, shock or the like.

Another particular object of this invention is to provide an improved quick-opening lid for pressure vessels characterized by simplicity, economy of construction and foolproof arrangement of components.

These and other objects and a better understanding of the invention will be had by referring to the following description and claims taken in conjunction with the attached drawings in which:

Figure 1:
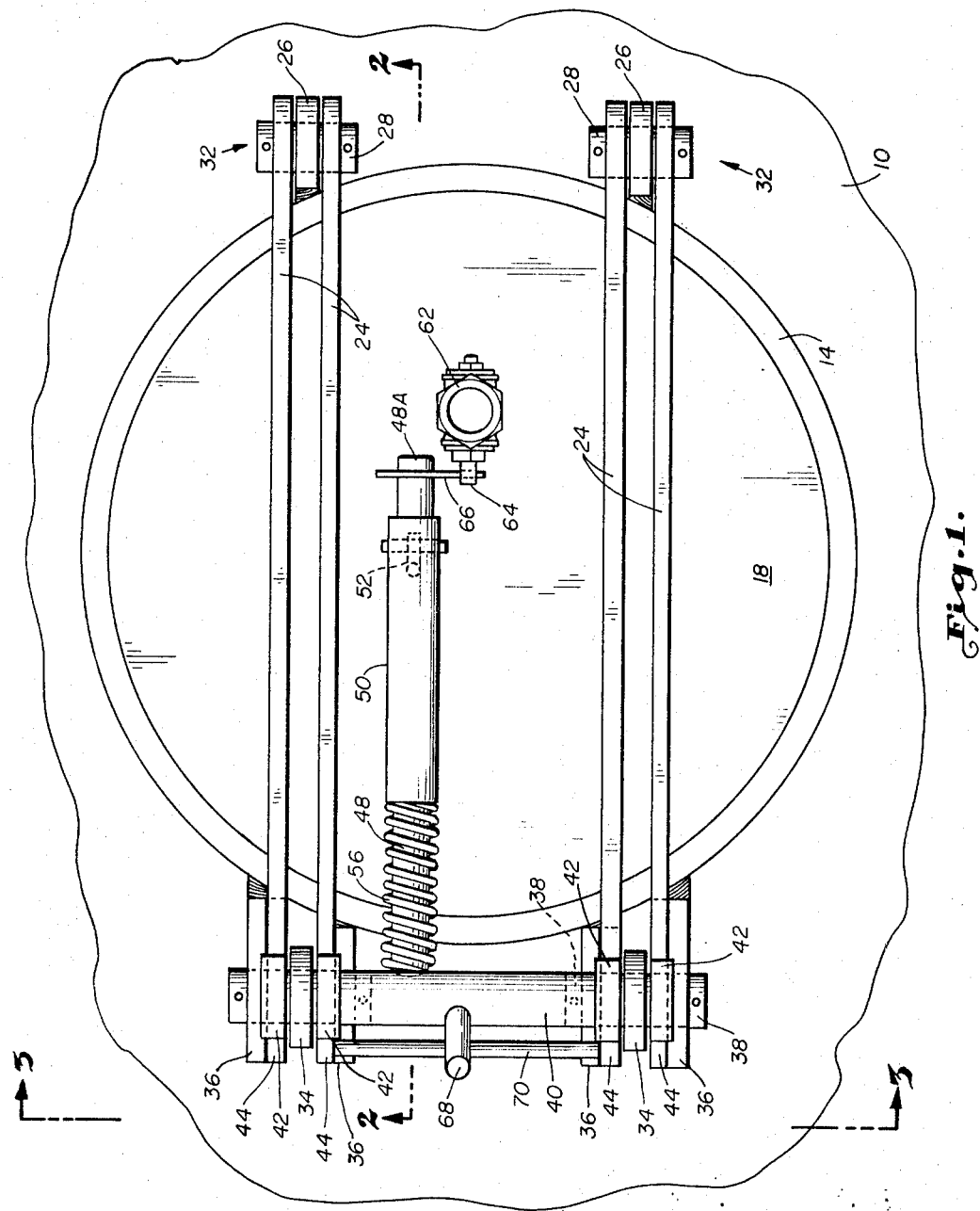
FIGURE 1 is a front elevational view of the improved quick-opening lid for a pressure vessel of this invention.

Referring now to the drawings, a portion of a pressure vessel is indicated generally by the numeral 10. Vessel 10 has an opening 12 therein and an extending tubular portion 16 communicating with opening 12. The tubular portion terminates in opening 16 and it is opening 16 that is closed by the improved quick-opening lid of this invention.

It is understood that the quick-opening lid of this invention may be applied to a variety of pressure vessels and opening 16 may be at the end of a pipe or may communicate with the pressure vessel in other ways. Closing opening 16 is a lid 18 which, as illustrated, has a peripheral groove 20 receiving an O-ring 22 therein as an effective sealing means.

Figure 2:
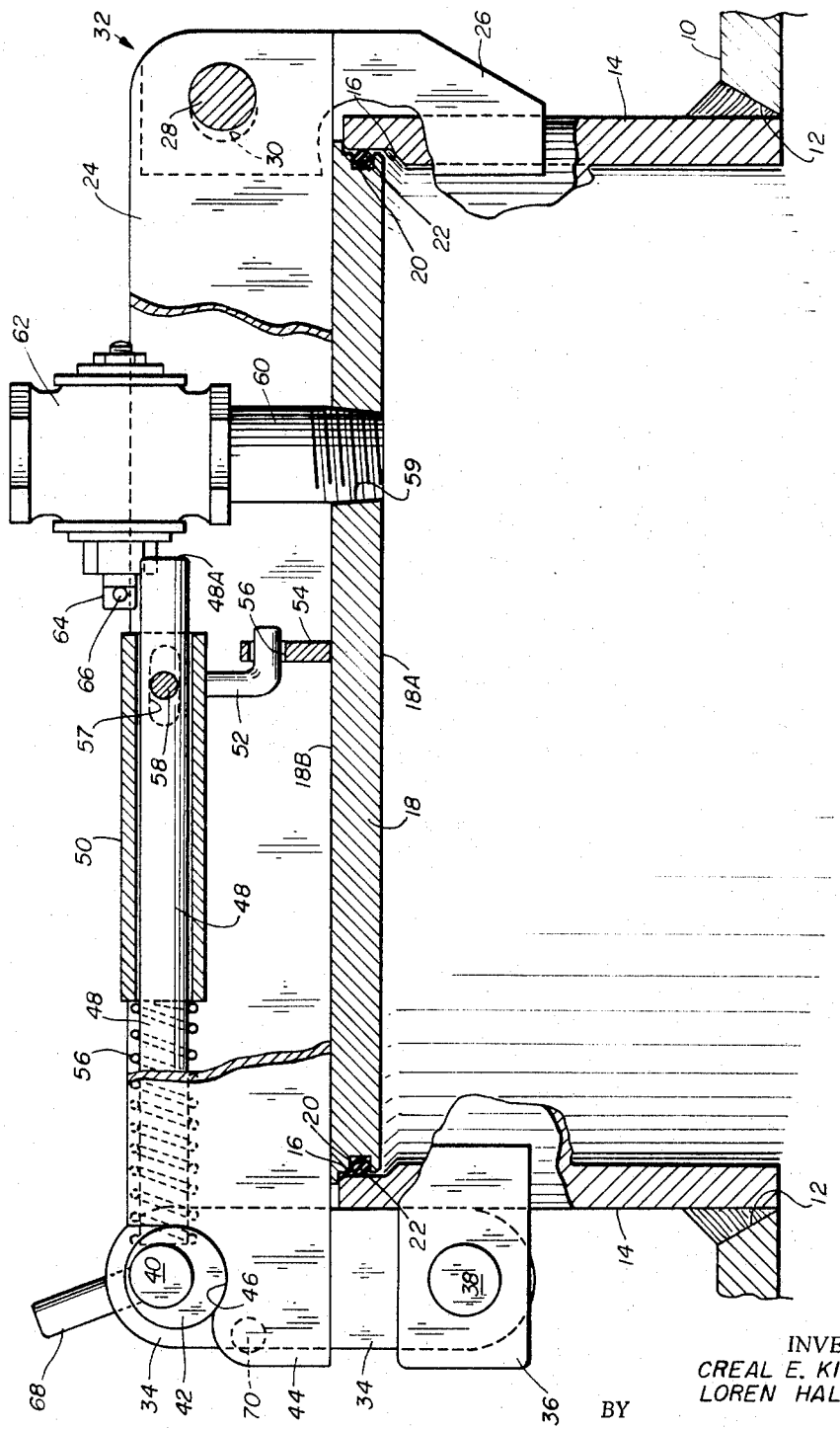
FIGURE 2 is a cross-sectional view taken along the line 2—2 of FIGURE 1.
Figure 3:
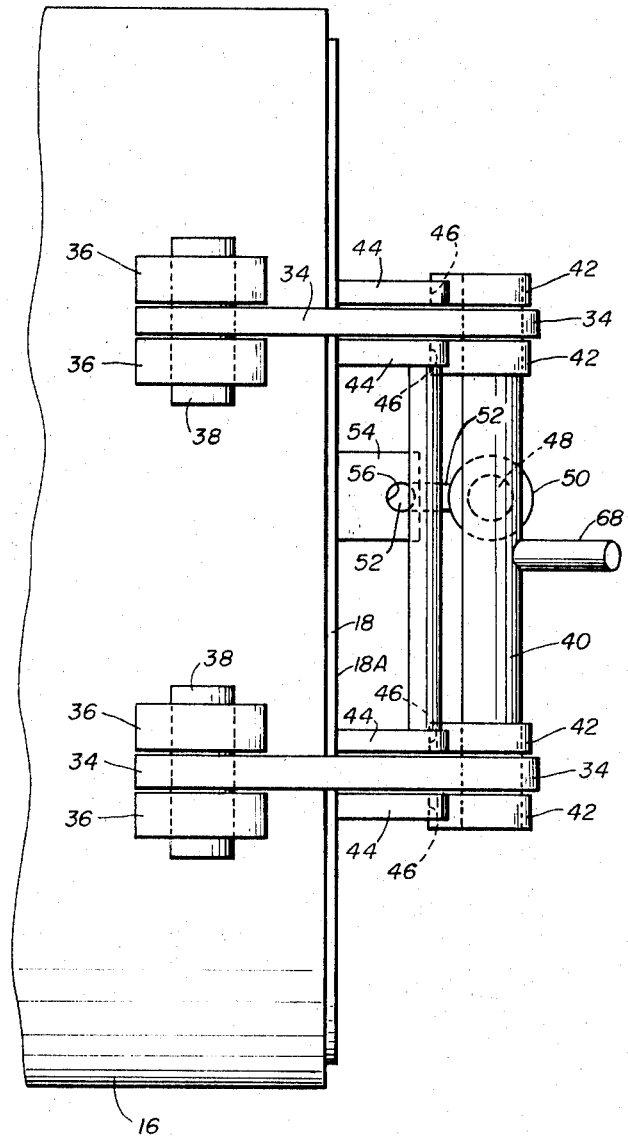
FIGURE 3 is a side view of the invention taken along the line 3—3 of FIGURE 1.

Lid 18 has an inner surface 18A and an outer surface 18B. Fixed to the outer surface 18B are spaced parallel lid structure members 24. In the illustrated embodiment, particularly shown in FIGURES 1 and 3, two pairs of spaced parallel structure members 24 are utilized. To one side of lid 18 there is provided hinges which, in the illustrated embodiment, include hinge members 26 having a portion welded to the vessel tubular portion 14. A hinge member 26 extends between each pair of lid structure members 24 and a hinge pin 28 pivotally connects the structure members 24 to the hinge member 26. As illustrated in FIGURE 2, the hinge pin receiving opening 30 in either of the structure members 24 and hinge members 26 is of a slotted arrangement permitting the lid 18 to be self-centering as it is closed into opening 16. The lid structure member 24, hinge member 26 and hinge pin 28 together constitute the lid pivot means generally indicated by numeral 32.

Exterior of the periphery of lid 18 opposite lid pivot means 32 is provided spaced parallel closure members 34 each of which are pivoted at one end to the vessel tubular portion 14 by means of pivot plates 36 welded to and extending from the tubular portion. Each of the pivot plates 36 has an opening therein aligning with an opening in the closure member 34. Pivot pins 38 pivotally support the closure members 34 to the pivot plates 36.

A cam shaft 40 is rotatably received and supported between the parallel closure members 34 at the end thereof opposite the end pivoted to the vessel tubular portion. Affixed to the cam shaft 40 to either side of each of the closure members 34 are eccentric cam members 42.

As best shown in FIGURE 2, each of the lid structure members 24 has a portion thereof extending exteriorly of the periphery of lid 18 opposite the lid pivot means 32, such portion being designated latching members and identified by numeral 44. Each of the latching member portions 44 include aligned peripheral areas partially defined by arcuate recessed areas 46. The arcuate recessed area 46 of each of the latching members 44 receives a cam member 42. When cam shaft 40 is rotated in one direction, the cam members 42 are aligned so that the closure members 34 may be pivoted so as to remove engagement thereof with the latching member portions 44 extending from lid 18. When the cam shaft 40 is rotated in the opposite direction, to the position shown in the illustrated embodiment, lid 18 is forced downwardly into closed position with the opening 16.

Radially extending from cam shaft 40 is a pivot arm 48 by which the cam shaft is rotated. Slidably received on the pivot arm 48 is a tubular handle member 50 which has depending radially therefrom a safety catch hook 52. Affixed to and extending perpendicularly from the outer surface 18B of the lid is a safety catch lug 54 having an opening 56 therein. When the tubular handle 50 is in the forward position the opening 56 receives a portion of safety catch hook 52 and thereby prevents the rotation of the cam shaft 40. A spring 56 compressibly positioned between the cam shaft 40 and one end of the tubular handle member 52 continually urges the tubular handle member 40 and thereby the safety hook 52 into engagement with the safety catch lug 54.

A small diameter opening 58 is provided in lid 18 receiving a nipple 60 which in turn receives a pressure relief valve 62. A shaft 64 extends from the valve 62 by which the valve is opened and closed, and extending perpendicularly from valve shaft 64 is a valve actuating handle 66. The outer end 48A of pivot arm 48 is arranged such that when the lid is in closed position, the pivot arm extends parallel to lid 18 with the outer end 48A adjacent to valve 62. With valve 62 in the closed position, handle 66 extends substantially parallel to the lid and over the outer end 48A of the pivot arm. Thus, arm 48 cannot be pivoted without first moving the pressure relief valve handle 66 to a position substantially perpendicular to the plane of the lid 18 which in turn rotates the valve shaft 64 to the valve open position. In other words, the cam shaft 40 of the lid closure means cannot be rotated without first moving the pressure relief valve handle 66 out of the way which automatically opens the pressure valve 62 to release any pressure which may exist in vessel 10.

Extending radially from the cam shaft 40 is a lifting lug 68 and positioned between the parallel latching members 44 is a release bar 70. When arm 48 is pivoted, rotating the cam shaft 40 towards open position, the lifting lug 68 ultimately engages release bar 70. At this point of the rotation of the cam shaft, the cams 42 have been rotated to substantially release pressure against the latching members 44. Further pivotation of the arm 48 forces the lifting lug 68 against release bar 70, pivoting the closure member 34 away from the latching members 44 and disengaging the cam members so that the lid may be easily opened. The combination of the lifting lug 68 and release bar 70 serves to facilitate the quick disengagement of the latching means from the lid when it is desired to open the lid.

As best shown in FIGURE 2, the tubular handle member 50 is provided with opposing slots 57 which receive a stop pin 58 press fitted in the pivot arm 48. This limits the slidable motion of the tubular handle member 50. To quickly open the lid of this invention, illustrated in the closed position, the operator must follow a sequence of steps which is made mandatory by the structure of the invention. The first step is that the pressure relief valve handle 66 must be moved out of the way of the pivot arm 48. In doing this the operator must rotate the pressure relief valve shaft 64 to the valve open position. Thus, any pressure remaining in the vessel 10 is discharged through the open valve. If a substantial amount of pressure exists in the vessel, the escape of the gas or liquid will be a warning to the operator that he must wait until the pressure in the vessel is discharged before proceeding further with the opening of the lid. With the valve handle 66 moved to a position substantially perpendicular to the lid, the operator next grabs the tubular handle member 50. Before the pivot arm 48 can be pivoted, safety hook 52 must be released from the safety catch lug 54. To do this, the operator slides the tubular handle member 50 in the direction towards spring 48. This moves the safety catch hook 52 out of engagement with the safety catch lug 54. The pivot arm 48 may then be pivoted. This rotates the cam shaft 40 releasing pressure applied by the cam members 42 against the latching members 44.

Further rotation of the cam shaft 40 results in the engagement of lifting lug 68 against release bar 70, forcing the pivotation of the closure members 34 and moving the cam shaft 40 with its cam members 42 thereon out of engagement with the latching members 44. The lid 18 is then free to be pivoted open.

In closing the lid 18, the process is reversed. Lid 18 is closed as far as possible into opening 16. Next, the closure members 34 are pivoted so that the cam members 42 rest in the arcuate recessed areas 46 of the latching members 44. Further pivotation of the pivot arm 48 rotates the cam shaft 40 and cams 42 forcing the lid 18 into sealed engagement with the opening 16. When the pivot arm 48 is approximately parallel lid 18, the operator pulls the tubular handle member 50 against spring 56 to allow the safety hook 52 to engage the safety catch lug 54. The final step in completely sealing the vessel is the movement of the handle 56 to close the pressure relief valve 62.

It can be seen that the arrangement of the invention is to substantially eliminate the possibility of injury from inadvertently opening a lid of a pressure vessel. The lid cannot be opened without first opening the pressure relief valve 62. The lid cannot be accidentally opened by vibration or shock since the compressive force of spring 56 maintains the pivot handle 58 in locked position at all times. With the pivot handle in locked position, the cams 42 cannot be moved out of engagement with the arcuate recessed areas 46 and the latching members 44. On the other hand, the quick opening lid of this invention is substantially foolproof in closure operations. If the operator closes the pressure release valve 62 first, such as by rotating handle 66 into the parallel position, the handle 66 extends in the direction of pivotation of the pivot arm 48 and prevents it from being properly positioned to permit the safety catch hook 52 engaging the safety catch lug 54.

The embodiment illustrated in the drawings is merely exemplary. The lid pivot means 32 can be arranged in many different ways. The utilization of lid structure members 24 is not mandatory. The latching members 44 may be separate elements extending from the exterior surface 18B of the lid. The method of pivotation of the closing members 34 may vary considerably, as well as the other details of construction of the invention, without departing from the spirit and scope thereof. The invention in general has been described with a great degree of particularity so as to set forth in detail an exemplification of the invention, it being understood that many arrangements may be made departing from the illustrated embodiment without departing from the spirit and scope of the invention.

What is claimed:

1. A quick-opening lid for a pressure vessel having an opening therein comprising:
    a lid closing said vessel opening, said lid having a small diameter opening therein,
    pivot means at one edge of said lid pivotally supporting said lid to said vessel,
    spaced apart latching members extending from the periphery of said lid at the edge thereof opposite said pivot means, each of said latching members having peripheries partially defined by an arcuate recessed area,
    a closure means pivoted to said vessel adjacent said latching members when said lid is in closed position, said closure means pivoted between open and closed positions,
    a rotatable cam member carried by said pivoted closure means, said cam member engaging said arcuate peripheries of said latching members when said closure means is in the closed position, said cam member rotatable in one direction to force said lid into sealed relation to said vessel opening and rotatable in the opposite direction to release said lid,
    a relief valve extending from the exterior of said lid closing said opening therein, said relief valve having an actuating handle extending substantially parallel said lid when said valve is in the closed position and extending substantially perpendicular said lid when said valve is in the open position, and
    a pivot arm extending from said cam member for the rotation thereof, the outer end of said pivot arm terminating adjacent said relief valve and arranged so that when said pivot arm is in the closed position and said relief valve handle is in the closed position, the relief valve handle extends over said pivot arm preventing the movement thereof without first rotating said valve actuating handle to the valve open position.

2. A quick-opening lid for a pressure vessel according to claim 1 including:
    a safety catch lug extending from the exterior of said lid, said lug having an opening therein,
    a tubular handle member slidably received on said pivot arm,
    a safety catch hook extending from said tubular handle member, said hook having a portion thereof received by said opening in said safety catch lug when said pivot arm is in the closed position, said hook being disengageable with said safety lug by the slidable movement of said tubular handle member, and
    spring means received on said pivot arm urging said tubular handle member and the safety catch hook extending therefrom towards said safety catch lug.

3. A quick-opening lid according to claim 1 including:
   a release bar positioned between said spaced apart latching members, said release bar extending parallel said lid, and
   a lifting lug extending radially from said cam member, said lifting lug engaging said release bar as said cam member is rotated to the open position to disengage said cam member from said latching member by the outward pivotation of said closure means.

4. A quick-opening lid according to claim 1 including spaced apart paralleled lid structure members affixed to the exterior of said lid, said structure members each having a length greater than the diameter of said lid, one end of each structure member being pivotally supported to said vessel and serving as said lid pivot means, the opposite ends of said structure members extending exterior the periphery of said lid being said latching member and each having peripheries partially defined by an outer arcuate recessed area.

References Cited

UNITED STATES PATENTS 3,045,861   7/1962   Dieter et al. _____ 220—57

THERON E. CONDON, *Primary Examiner.*

J. B. MARBERT, *Assistant Examiner.*